(12) United States Patent
Doi et al.

(10) Patent No.: US 8,954,849 B2
(45) Date of Patent: Feb. 10, 2015

(54) COMMUNICATION SUPPORT METHOD, SYSTEM, AND SERVER DEVICE

(75) Inventors: Jun Doi, Yokohama (JP); Kaori Fujiwara, Kawasaki (JP); Michiaki Tatsubori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 12/331,945

(22) Filed: Dec. 10, 2008

(65) Prior Publication Data

US 2009/0158175 A1 Jun. 18, 2009

(30) Foreign Application Priority Data

Dec. 12, 2007 (JP) ................................. 2007-320862

(51) Int. Cl.
- *G06F 3/048* (2013.01)
- *H04L 29/06* (2006.01)
- *H04L 12/18* (2006.01)

(52) U.S. Cl.
CPC ........... *H04L 67/38* (2013.01); *A63F 2300/535* (2013.01); *A63F 2300/5553* (2013.01); *A63F 2300/572* (2013.01); *H04L 12/1827* (2013.01)
USPC ............................. 715/706; 715/758; 715/757

(58) Field of Classification Search
USPC .......................................................... 715/706
See application file for complete search history.

(56) References Cited

U.S. PATENT DOCUMENTS

| 7,716,163 | B2 * | 5/2010 | Reynar et al. ................. 707/739 |
| 2002/0087315 | A1 * | 7/2002 | Lee et al. ....................... 704/256 |
| 2004/0179037 | A1 * | 9/2004 | Blattner et al. ............... 345/751 |
| 2005/0079474 | A1 * | 4/2005 | Lowe ............................ 434/236 |

(Continued)

FOREIGN PATENT DOCUMENTS

| JP | 10-134202 A | 5/1998 |
| JP | 2000076167 A2 | 3/2000 |
| JP | 2001160021 A2 | 6/2001 |

(Continued)

OTHER PUBLICATIONS

Neviarouskaya, Alena et al., Recognition of Affect Conveyed by Text Messaging in Online Communication, Proceedings of Online Communities and Social Computing Second International Conference, Beijing, China, Jul. 22-27, 2007, pp. 141-150.*

(Continued)

*Primary Examiner* — Matt Kim
*Assistant Examiner* — William Trapanese
(74) *Attorney, Agent, or Firm* — Cantor Colburn LLP

(57) ABSTRACT

A method for supporting communication among avatars representing users in a virtual world shared by a plurality of users' client terminals and a server connected with each other through a network. The method includes the steps of: accumulating statistical information, which includes (i) a combination of a component of a message transmitted by one or more avatars and avatar motion matching the component, and (ii) a degree of usage of the combination; generating a keyword group from the components of a message transmitted by the one or more avatars in response to the transmission of the message; searching through the statistical information; obtaining one or more avatar motion candidates; and presenting the candidates to the user of the avatar. A system for supporting communication among avatars and a communication support server device in a virtual world are also provided.

15 Claims, 13 Drawing Sheets

(56) References Cited

U.S. PATENT DOCUMENTS

2008/0091692 A1* 4/2008 Keith et al. .................. 707/100
2008/0235285 A1* 9/2008 Della Pasqua ............. 707/104.1

FOREIGN PATENT DOCUMENTS

| JP | 2002190034 A2 | 7/2002 |
| JP | 2005-250859 A | 9/2005 |
| JP | 2006-285512 A | 10/2006 |

OTHER PUBLICATIONS

Kyoko Ito, et al., "Experiment on a Networked Community . . . Navigator", Journal of information Processing Society of Japan, Jul. 15, 2003, vol. 44, No. 7, pp. 1812-1827.

Takashi Hirata, et al., "Support for Community Knowledge . . . Metaphor", Journal of Japanese Society for Artificial Intellegence, Nov. 1, 2001, vol. 16, pp. 225-233.

* cited by examiner

MOTION INDEX TABLE

| MOTION ID | GLOBAL COMMAND | MOTION DATA INDEX |
|---|---|---|
| 10003025 | /wave | aa5 |
| 10003026 | /point | ac1 |
| 10003027 | /yes | ab2 |
| 10003028 | /no | ab3 |
| ... | ... | ... |

FIG. 3

STATISTICAL INFORMATION TABLE

| WORD GROUP | MOTION ID | DEGREE OF USAGE | NUMBER OF USAGE | LAST USED DATE |
|---|---|---|---|---|
| I, love | 200541 | 0.52 | 15452 | 2010/10/20 - 11:22:30 |
| I, love | 100412 | 0.12 | 8451 | 2010/10/21 - 20:01:41 |
| love, you | 325011 | 0.33 | 1533 | 2010/09/30 - 01:51:20 |
| do, you | 256222 | 0.45 | 268440 | 2010/10/19 - 13:10:11 |
| ... | ... | ... | ... | ... |

FIG. 4

COUNTER TABLE

| WORD GROUP | NUMBER OF USAGE |
|---|---|
| I, love | 52366 |
| love, you | 25666 |
| do, you | 786622 |
| do, not | 155233 |
| ... | ... |

FIG. 5

DEGREE OF IMPACT CORRESPONDING
TO WORD GROUP

| WORD GROUP | DEGREE OF IMPACT |
|---|---|
| WOW, nice | 3/12 |
| WOW, sword | 4/12 |
| WOW, give | 5/12 |
| nice, sword | 5/12 |
| nice, give | 6/12 |
| give, me | 9/12 |
| give, that | 10/12 |

FIG. 9

DATABASE SEARCH RESULT

| WORD GROUP | MOTION ID | DEGREE OF USAGE |
|---|---|---|
| WOW, nice | 200784 | 0.41 |
| | 005322 | 0.25 |
| | 110333 | 0.11 |
| WOW, give | 200784 | 0.8 |
| nice, sword | 005322 | 0.65 |
| | 663154 | 0.25 |
| nice, give | 005322 | 0.72 |
| | 2007784 | 0.1 |
| | 663154 | 0.05 |
| give, me | 663154 | 0.43 |
| | 982351 | 0.22 |
| | 200784 | 0.12 |
| | 005322 | 0.08 |
| give, that | 110333 | 0.31 |

FIG. 10

FLOW OF UPDATE PROCESSING

SEARCH USING COMBINATION OF WORDS
AND MOTION ID AS KEY

| WORD GROUP | MOTION ID | DEGREE OF USAGE |
|---|---|---|
| WOW, nice | 005322 | 0.25 |
| nice, sword | 005322 | 0.65 |
| nice, give | 005322 | 0.72 |
| give, me | 005322 | 0.08 |

(a)

(b)

(c)

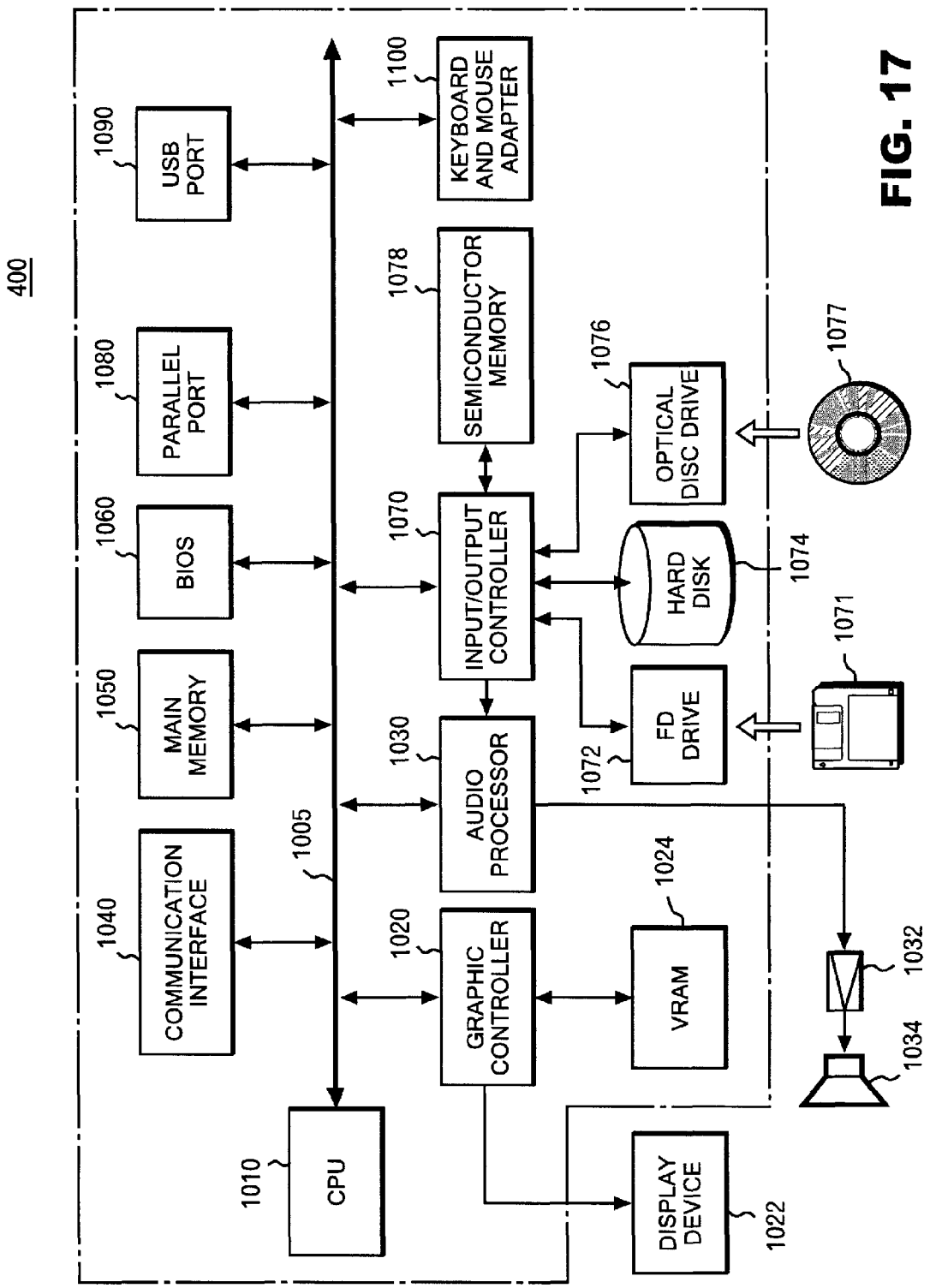

COMMUNICATION SUPPORT METHOD, SYSTEM, AND SERVER DEVICE

CROSS-REFERENCE TO RELATED APPLICATIONS

This application claims priority under 35 U.S.C. §119 from Japanese Patent Application No. 2007-320862 filed on Dec. 12, 2007, the entire contents of which are incorporated herein by reference.

BACKGROUND OF THE INVENTION

1. Field of the Invention

The present invention relates to a technique for supporting communication in a virtual world.

2. Description of Related Art

In a virtual world (also referred to as a virtual space) generated by a server on a network, a character representing a user (hereafter referred to as avatar) can freely move around, such as going shopping, and communicating with other avatars, and therefor the user can enjoy the virtual world as if it were an extension of the real world. When avatars communicate with other avatars in the virtual world, it is important that the avatars perform some actions. Meanwhile, a major communication tool in the virtual world is the so-called chat, which is an exchange of messages inputted from the keyboard for example.

Previously, among methods for making an avatar have some motions in a chat, a widely used method is to prepare a large number of commands given in specific forms such as /wave/. Here, the "wave" delimited by the slashes is a command indicating that an avatar waves its hand.

Japanese Patent Application Publication No. 2000-076167 and Japanese Patent Application Publication No. 2001-160021 disclose other methods in which an avatar moves automatically in response to a reserved word appearing in a text in a chat. Furthermore, Japanese Patent Application Publication No. 2002-190034 discloses a method in which a user selects an emotion explicitly from a group of predetermined types of emotions so that his/her avatar can move according to the selected emotion.

However, such methods for making an avatar have a motion by use of a command have a problem that commands corresponding to a large number of motion definitions need to be prepared in the environment where there is no restriction in defining avatar motion. Moreover, even if such a large number of commands could be prepared, it would be difficult for a user to make full use of the commands. There is also a problem that an erroneous command inputted by a user would be treated as a remark made by his/her avatar, resulting in sending a meaningless remark to another avatar. Meanwhile, in the methods disclosed in Patent Documents 1 and 2, each of the reserved words needs to be assigned with a suitable motion.

Accordingly, an enormous amount of workload is required for assigning motions to the reserved words in the environment where there is no restriction in defining avatar motion. Moreover, an operation is uniquely defined for each of the reserved word, and thus an avatar sometimes moves differently from the way a user intends.

In contrast, in the method disclosed in Patent Document 3, avatar motions are selected by a user, and thus his/her avatar hardly moves differently from the way he/she intends. However, it is difficult for a user to promptly select a required motion when there are numerous types of motions. This is because, for example, if many icons each representing a motion are shown on the screen, a large part of the screen is occupied by the icons. Then, a scrollbar or the like may be provided to reduce the part occupied by the icons. As a result, it takes some time to select an intended motion.

SUMMARY OF THE INVENTION

The present invention has been thought of in view of the above objects and aims to provide, in the case where there are numerous types of motions to be performed by an avatar, a communication support method for allowing a user to intuitively and efficiently input avatar motions, and a system of the method.

A first aspect of the present invention provides a method for supporting communication in a virtual world shared by a plurality of client terminals and a server which are connected with each other through a network. The communication support method accumulates statistical information, which is combinations of components of a message transmitted by one or more avatars and avatar motions matching the components, and a degree of usage of the combinations. Then, in response to transmission of a message by an avatar, a keyword group is generated from the components of the message. After a search is made in the statistical information by use of the keyword group, the avatar motions and the degree of usage, which are associated with the keyword group, are extracted. Thereafter, the avatar motions having a degree of usage that satisfies a predetermined condition are obtained as motion candidates for the avatar for the message transmitted. The one or more avatar motions thus obtained are presented as avatar motion candidates to the user of the avatar.

A "component" is essential in composing a sentence, and refers to a word, for example. In this case, a "component group" is a group of multiple words. Meanwhile, an "avatar motion" refers to an action expressed externally by an avatar, such as body movements and facial expressions. For example, avatar motions include the avatar waving its hand and showing an angry face. A "degree of usage" indicates the degree of use or the state of an avatar motion corresponding to each of the components, and refers to, for instance, a usage frequency, a usage frequency during a certain period of time, or a value obtained by weighting the usage frequency. A "history" indicates statistical information of the past, and refers to, for instance, the number of times of update or the date of last update.

By using the configuration of the present invention, it is possible to select, from numerous motion expressions, avatar motions matching the content of a communication message, and to present the avatar motions to a user. Moreover, in this configuration, only a limited number of avatar motions are presented, and a user is allowed to select an avatar motion out of one or more avatar motions presented. Thus, the user can control his/her avatar to have an expression intuitively and efficiently.

Another aspect of the present invention updates the statistical information according to: each of keywords included in the keyword group obtained from components of a message transmitted by an avatar; and a motion of the avatar which matches the each of the keywords and have been selected by the user. A record having the statistical information updated is accumulated in the statistical information as an update history. The statistical information is edited according to the history. Here, "editing" indicates organizing statistical information, and refers to, for instance, deleting or moving unnecessary information elsewhere. By editing the statistical information according to the update history, in other words, by organizing the pieces of statistical information which have a low degree of usage or which have not been used for a long time, the statistical information can be kept in the best state.

The present invention further provides:

(a) a method for supporting communication among avatars representing users in a virtual world shared by a plurality of users' client terminals and a server connected with each other through a network, the communication support method including the steps of:

accumulating statistical information including a combination of a component of a message transmitted by one or more avatars and an avatar motion matching the component, and a degree of usage of the combination;

generating a keyword group from the components of a message transmitted by an avatar in response to the transmission of the message;

searching through the statistical information by use of the keyword group to extract the avatar motions and the degrees of usage according to the keyword group; obtaining one or more avatar motions having a degree of usage satisfying a predetermined condition, as motion candidates for a motion that the avatar is to take for the message transmitted thereby; and presenting the one or more avatar motions obtained as avatar motion candidates, to the user of the avatar;

(b) a computer readable article of manufacture tangibly embodying computer readable instructions for executing a computer implemented method for supporting communication among avatars representing users in a virtual world shared by a plurality of users' client terminals and a server connected with each other through a network;

(c) a system for supporting communication among avatars representing users in a virtual world shared by a plurality of users' client terminals and a server which are connected with each other through a network, the communication support method, including:

a statistical information storage unit for storing combinations each including a component of a message transmitted by one or more avatars and an avatar motion matching the component, and a degree of usage of each of the combinations;

a keyword generation unit for generating a keyword group from the components of a message transmitted by an avatar in response to the transmission of the message;

a motion extracting unit for searching through the statistical information by use of the keyword group to extract the avatar motions and the degrees of usage according to the keyword group;

a motion candidate determination processing unit for obtaining the avatar motions each having a degree of usage that satisfies a predetermined condition, as motion candidates for a motion that the avatar is to take for the message transmitted thereby; and a motion presentation unit for presenting one or more of the avatar motions obtained as the avatar motion candidates, to the user of the avatar; and (d) a communication support server device in a virtual world shared by a plurality of users' client terminals and a server connected with each other through a network, the communication support server device including:

a receiving unit for receiving any one of a message and a keyword group of the message in response to input of the message from any one of the users;

a statistical information storage unit for storing combinations each including a component of a message transmitted by one or more avatar users and an avatar motion matching the component, and a degree of usage of each of the combinations; and a transmission unit for transmitting, to the client terminal having transmitted the message, the message or the keyword group received, and avatar motion candidates having been recognized to match the message in the statistical information storage unit.

BRIEF DESCRIPTION OF THE DRAWINGS

For a more complete understanding of the present invention and the advantage thereof, reference is now made to the following description taken in conjunction with the accompanying drawings:

FIG. 3 is diagram showing a configuration of a motion index table;

FIG. 4 is a diagram showing a configuration of a statistical information table;

FIG. 5 is a diagram showing a configuration of a counter table;

FIG. 9 is a diagram showing data of a degree of impact for individual word groups;

FIG. 10 is a diagram showing a result obtained from a search made in the statistical information table;

FIG. 17 is a diagram showing a representative example for the hardware configuration of the server and a client terminal.

DETAILED DESCRIPTION OF THE PREFERRED EMBODIMENT

Figure 1:
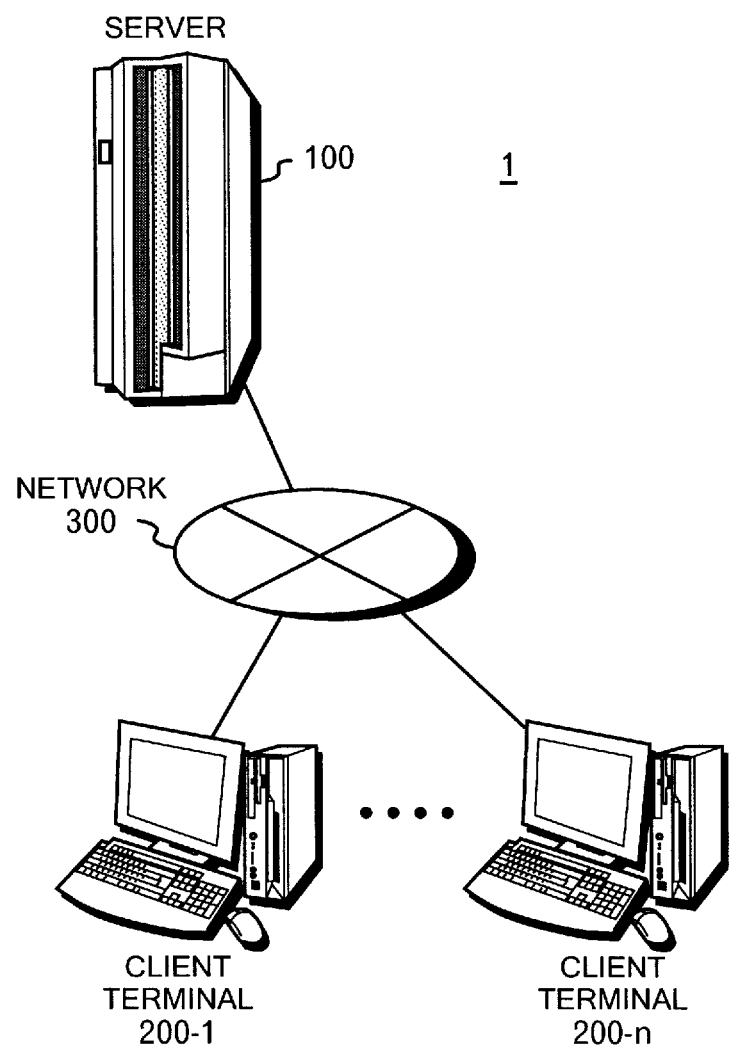
FIG. 1 is a diagram showing a configuration of an embodiment of a communication support system to which the present invention is applied.

In this section, an embodiment of the present invention will be described with reference to the drawings. FIG. 1 is a diagram showing a configuration of an embodiment of a communication support system 1 to which the present invention is applied. Each of terminals 200-1, 200-2 . . . 200-*n* (referred to simply as a client terminal when distinction is unnecessary among the terminals 200-1 to 200-*n*) is a client terminal of a user, is connected to a network 300, such as represented by the Internet or an intranet, and is capable of transmission and reception with a server 100 (referred to as a server). A user carries out operations on the client terminal, and therefor is allowed to perform processing on the server via the network 300. Additionally, in the case where data is stored in the server, the data can be, for example, acquired and updated by the client terminal. It should be noted that the number of servers in this configuration is not limited to one, and there may be multiple servers.

Figure 2:
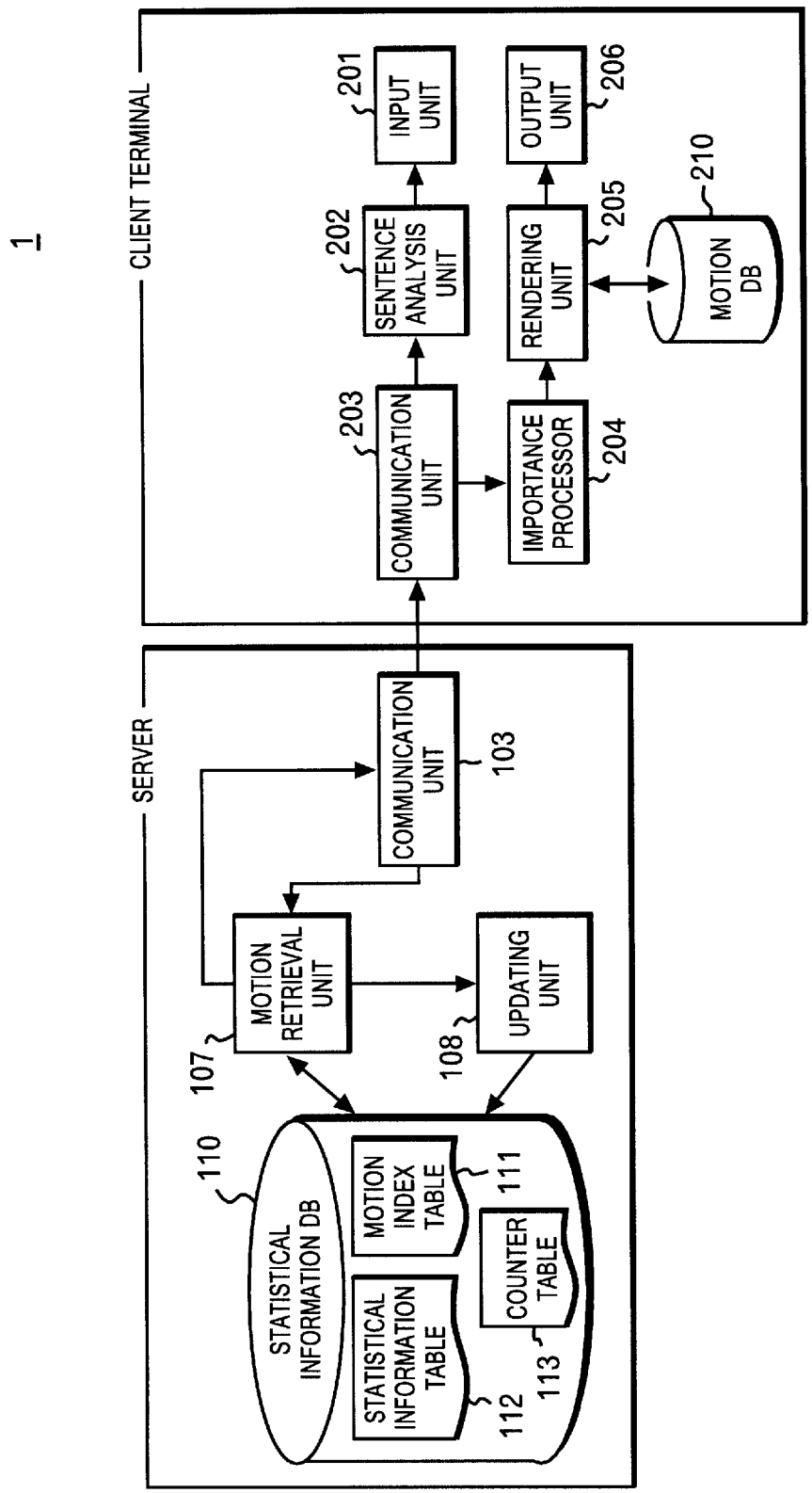
FIG. 2 is a diagram showing a basic system configuration of a client terminal and a server of the communication support system.

FIG. 2 is a diagram showing a basic system configuration of the client terminal and the server of the communication support system 1 of the embodiment. The server includes a communication unit 103, a motion retrieval unit 107, an updating unit 108, and a statistical information database 110 (hereafter, database will be referred to as DB for simplification). The statistical information DB 110 includes a motion index table 111, a statistical information table 112, and a counter table 113. Meanwhile, the client terminal includes an input unit 201, a sentence analysis unit 202, a communication unit 203, an importance processor 204, a rendering unit 205, an output unit 206, and a motion DB 210. Note that the sentence analysis unit 202 and the importance processor 204 may be provided in the server, while the motion retrieval unit 107 and the updating unit 108 may be provided in the client terminal. Moreover, the motion DB 210 may be provided in the server as an individual DB as mentioned above, or otherwise as a table in the statistical information DB 110 in the server.

The communication units 103 and 203 transmit and receive data, such as a conversational sentence, inputted by a user using the input unit 201, between the server and the client terminal. The sentence analysis unit 202 generates on the basis of the conversational sentence inputted by the user a search condition for searching the statistical information table 112. The motion retrieval unit 107 makes a search in the statistical information table 112 according to the search condition generated by the sentence analysis unit 202, and thereby obtains information of motion candidates. In the case where the user assigns an avatar motion by use of, for example, one of unique motion identifiers or IDs (referred to as motion IDs) assigned to motions in the virtual world, the motion retrieval unit 107 obtains motion information corresponding to the motion ID from the motion index table 111. The importance processor 204, on the basis of the information of motion candidates, selects motion candidates to be presented to a user. The rendering unit 205 obtains data of a script describing a motion (hereafter referred to as motion data for simplification) from the motion DB 210, in reference to the information of the motion candidate or to the motion information. The rendering unit 205 further generates an image from the obtained motion data and outputs the resultant image through the output unit 206. The updating unit 108 reflects a history of motions used by users, to the statistical information table 112 and the counter table 113.

The sentence analysis unit 202 is an example of a keyword generation unit, the statistical information table 112 is an example of a statistical information storage unit, the motion retrieval unit 107 is an example of a motion extraction unit, the importance processor 204 is an example of a motion candidate determination processor and a motion presentation unit, the updating unit 108 is an example of a statistical information updating unit and a statistical information editing unit, and the communication unit 103 is an example of a receiver and a transmitter. Note that the storage units are not limited to a DB in a hard disk, and may be an external storage device, such as a memory, a magnetic tape, or a flexible disk. Hardware configurations of the server and the client terminal will be described later.

Next, a description will be given of the motion index table 111, the statistical information table 112 and the counter table 113 which constitute the statistical information DB 110, and of the motion DB 210. The data configurations described below include typical items. FIG. 3 is a diagram showing a data configuration of the motion index table 111. The motion index table 111 holds data necessary for associating a global command or a motion ID with corresponding motion data. The motion index table 111 includes a motion ID region, a command region and a motion data index region. The motion IDs are stored in the motion ID region, and global commands for motions in the virtual world are stored in the command region. In the motion data index region, addresses of the motion data in the motion DB 210 are stored.

In addition, a user is allowed to define a user-specific command corresponding to one of the motion IDs, store the command in a user command DB or table, and provide the user command DB or table in the client terminal. By using the user-specific command, a user can assign a movement of his/her avatar more easily. Furthermore, in a case of defining a command specific to a user group instead of to a user, the user command DB or table may be provided in the server and be shared in the group. The user command DB or table is used to convert a user-specific command inputted by the user into a motion ID. Here, the user-specific ID may be converted into a global command instead of the motion ID.

A user can input a motion of his/her avatar within a conversational sentence by using any of the above-mentioned motion ID, global command, and user-defined command. When a user-defined command is inputted into a conversational sentence, the user-defined command is converted into a motion ID by use of the user command DB, and then processing is initiated. An example of the conversion of a conversational sentence including a user-specific command is shown below. (1) is a conversational sentence inputted by a user, and (2) is the conversational sentence after the user specific command is converted into a motion ID. Here, suppose that "10003025" is registered as the motion ID for a user-specific command "wv" in the user command DB:

(1) hi, /wv/do you wanna come with me?/10005201/

(2) hi, /10003025/do you wanna come with me?/10005201/

If a conversational sentence inputted as shown in (1) above includes "wv" as a user-specific command, the command is converted into motion ID "10003025" as shown in (2) by use of the user command DB.

FIG. 4 is a diagram showing a configuration of the statistical information table 112. In the embodiment of the present invention, statistics reflecting the combination of a word and a motion, such as an N-gram, are generated on the basis of conversational sentences, and a motion suitable for the conversational sentence is selected by use of the statistics. In the statistics, such as an N-gram, a frequency of appearance is acquired for each combination of N notational units (gram) in a target text, and therefor it is possible to obtain an appearance frequency pattern and the like concerning an expression having a certain length (collocation expression) within a text. The embodiment of the present invention above, in other words, is to obtain an appearance frequency for the combination of N words (hereafter referred to as word group) and a motion. The obtained information is then held in the statistical information table 112.

The statistical information table 112 includes a word group region, a motion ID region, a degree of usage region, a usage counter region, and a last used date region. Each piece of information included in the table is uniquely defined by a word group and a motion ID. The word group, which refers to a combination of words in a conversational sentence, is stored in the word group region. A degree of usage, which is a combination of a word group and a motion ID, is stored in the degree of usage region. Meanwhile, the number of times a combination of a word group and a motion ID has been used is stored in the usage counter region, and a last used date of a combination of a word group and a motion ID is stored in the last used date region.

FIG. 5 is a diagram showing a configuration of the counter table 113. The counter table 113 includes a word group region and a usage counter region. For calculation of the degree of usage, the number of times each word group having been used is recorded in the counter table 113. The statistical information DB 110 including these tables described above is provided in the server in the present embodiment. However, in order to improve performance, it may be configured so that copies of these tables are stored in the client terminal, and the copies are updated by synchronizing with the server as needed.

Figure 6:
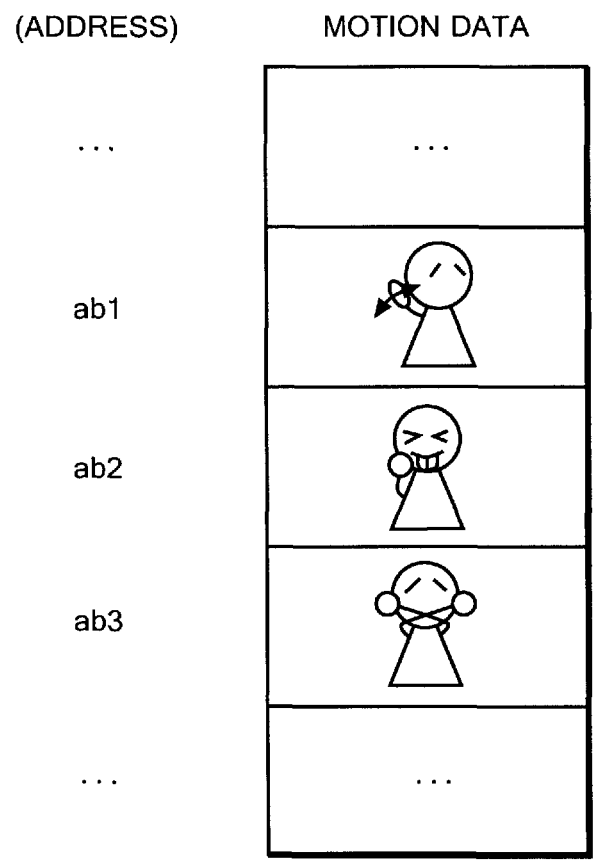
FIG. 6 is a diagram showing a configuration of a motion DB.

FIG. 6 is a diagram showing a configuration of the motion DB 210. The motion DB 210 includes a motion data region. By having addresses of the motion data stored in the motion DB 210 in the motion data index region of the motion index table 111, the motion DB 210 can increase its search speed.

Figure 7:
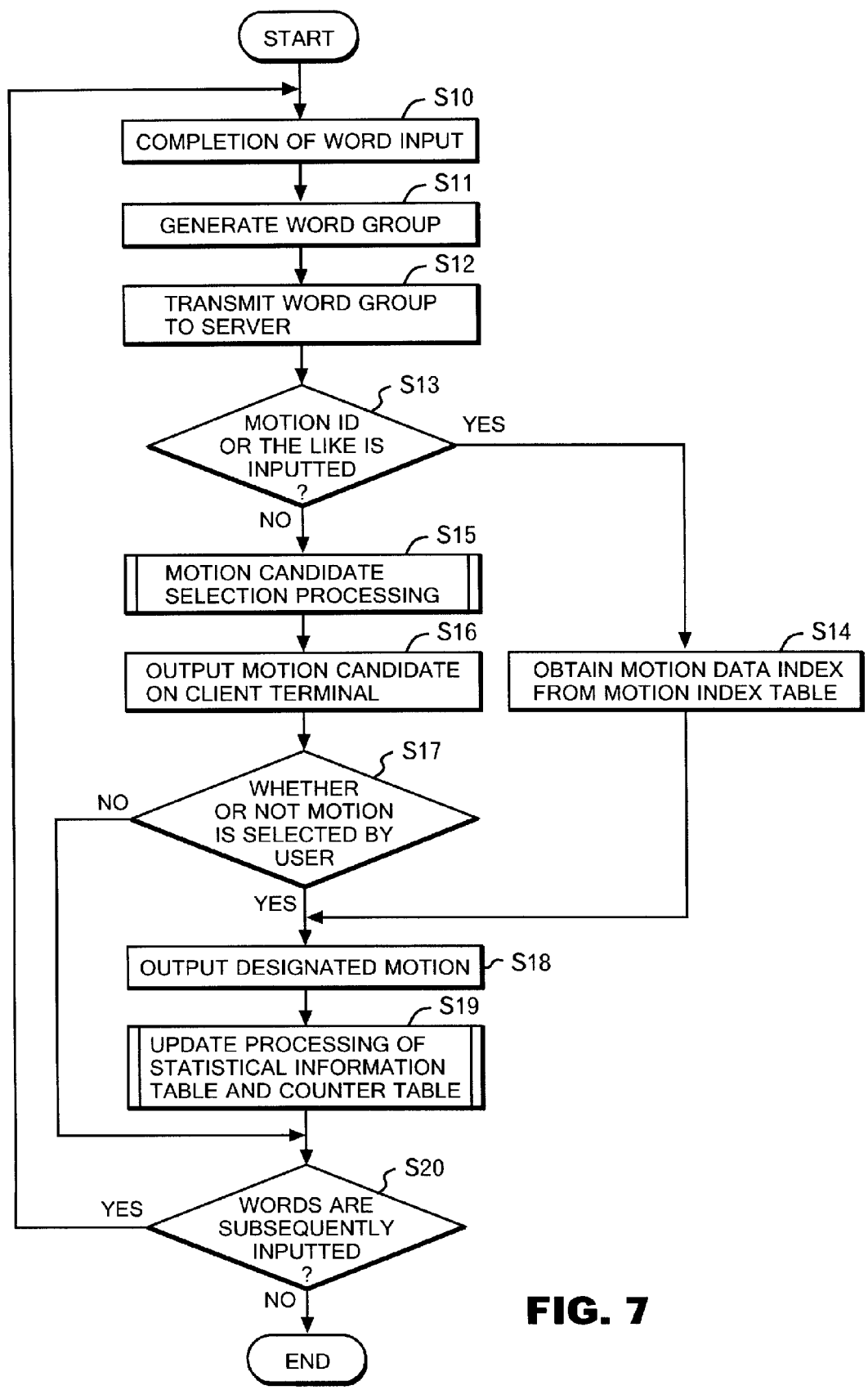
FIG. 7 is a diagram illustrating the processing flow of displaying motion candidates and updating statistical information in response to input of a conversational sentence.

FIG. 7 is a diagram illustrating the processing flow of displaying motion candidates and updating statistical information in response to input of a chat text. The processing is initiated when a user starts inputting a text using the input unit 201, such as a keyboard. When the user completes input of a word (step S1), the inputted word is forwarded to the sentence analysis unit 202, and a word group is formed on the basis of the conversational sentences having been inputted (step S11). Since this is to be performed after input of each word, the sentence may not be completed. When it is detected, for example, that no input has been made for a certain period of time, or that a space is inputted, it is determined that the word input has been completed. In order to form a word group from a conversational sentence, it is necessary to split the sentence into words. In the following section, the method for splitting a sentence into words will be described.

Sentences in Western languages, such as English and French, are written with spaces between words. Accordingly, there is an implicit understanding that generally a unit separated by spaces is a word, and thus a sentence can be easily segmented into words by use of spaces inserted between the words. In contrast, in languages, such as Japanese, sentences are not written as in the above-mentioned languages, and therefor words are not separated by spaces or the like. Thus, it is difficult to split a sentence into words. In this regard, it is effective to use a morphological analysis to split a sentence into words in languages, such as Japanese, which are not written with spaces between words.

A morpheme refers to the smallest unit of characters that has a semantic meaning. A morphological analysis is a method for identifying a word in a sentence of a natural language, for analyzing the inflection thereof, and for identifying the word class. By utilizing this method, it is possible to split a sentence into words in languages, such as Japanese, in which sentences are written with no space between words. In this method, sentences are split into words according to a dictionary in this method; therefor, a dictionary for morphological analysis is required. This method can also be used for Western languages, such as English and French.

A conversational sentence is split into words by use of the above-mentioned method or the like. Then, a keyword group, which provides search conditions to be used in the statistical information table 112, is formed by combining the words. In other words, a word group is formed. The entire portion of an inputted conversational sentence may be processed, or only a part, such as N characters immediately before an input cursor on the chat screen, or N characters each from the beginning and the end of a sentence immediately before the cursor. Otherwise, since, when a sentence is split into words in the morphological analysis, a word class of each of the words can be obtained, words to be included in a word group may be selected according to a specific word class.

Additionally, the number of words to be included in a word group is not limited. In the case where the entire portion of an inputted conversational sentence is to be processed, the number of words to be included in a word group may be as small as two. This is because, even if only a few words are included in a word group, all the combinations of the word included in the conversational sentence would be included, and thus there would not be any significant difference in the accuracy of selecting motion candidates.

Referring back to FIG. 7, after a word group is formed on the basis of the conversational sentences in step S11, the word group is transmitted from the communication unit 203 of the client terminal to the communication unit 103 of the server (step S12). Note that, if a motion ID or the like is inputted, the motion ID or the like is transmitted to the server as well as in step S12. Subsequently, a determination is made on whether or not a motion ID or the like is inputted from the user (step S13).

If the motion ID or the like is not inputted, a motion candidate selection processing is carried out for presenting, to a user, motion candidates which are assumed to match the content of the conversation (step S15). In contrast, if a motion ID or the like is inputted, a motion data index is obtained from the motion index table 111 by using the motion ID or the like as a search condition (step S14). Below, a description will be given of the motion candidate selection processing.

Figure 8:
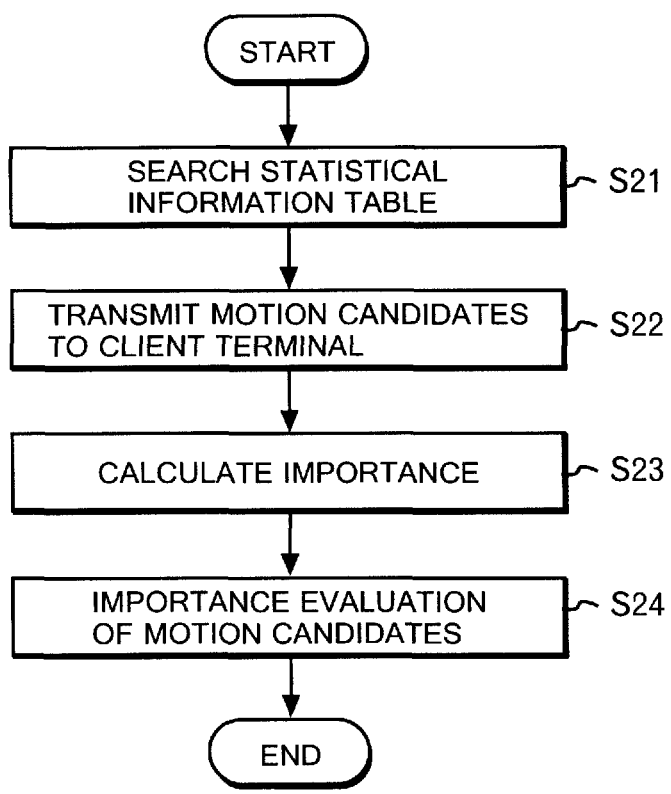
FIG. 8 is a diagram illustrating the processing flow of motion candidate selection.

FIG. 8 is a diagram illustrating the flow of the motion candidate selection processing. The processing is performed by the motion retrieval unit 107 in the server and the importance processor 204 in the client terminal. The processing is initiated when it is determined in step S13 that a motion ID or the like has not been inputted in a conversational sentence. Then, a search is made in the statistical information table 112 by using, as the search condition, the word group formed on the basis of the dialogue (step S21). As a result, word groups, motion IDs corresponding to the word groups, and respective degrees of usage of the combinations of the word groups and the motion IDs are obtained. In this step, only combinations having a degree of usage satisfying a predetermined condition are to be obtained.

Such a predetermined condition is, for example, that a condition that a degree of usage is not lower than a threshold value, or a condition for extracting the combinations having a high degree of usage, such as five of the combinations having the highest degree of usage. This is because it is considered that combinations having a low degree of usage are less likely to match the conversation, and thus are not required by the user. Note, it is preferable that multiple search results be obtained. This is because a user may obtain a motion that does not match his/her intention on the basis of only one search result.

Subsequently, the search results obtained in step S21 are transmitted to the client terminal (step S22), and the importance processor 204 calculates an importance for each of the motion candidates by use of the search results (step S23). The importance refers to a value obtained by recalculating, for each motion ID, any one of the following values: the degree of usage of each combination of a word group and a motion ID, which is the result of the search made in step S21; and a value obtained by weighting the degree of usage of the combination of a word group and a motion ID. Weighting refers to assigning a degree of impact to a word group in reference to the degree of influence the word group would have on a conversation in terms of motion determination. In other words, weighting is to create a distinction among the word groups according to degree of impact each word group would have on the conversation in terms of determination of avatar motion. This distinction is made under the assumption that word groups in a conversational sentence have different degrees of impact on motion determination. Examples of weighting are: a method for allocating a relative impact to each of the word groups according to the order that the word groups are inputted by a user; a method for allocating a relative impact to each of the word groups according to emotion that a word carries; and a method for allocating a relative impact to each of the word groups according to degree of usage of the word groups.

A description will be given of the method of weighting in accordance with the order that the word groups are inputted by a user. For instance, in the case where the following conversational sentence is inputted, a word inputted more recently is assigned with a higher degree of relative impact:

Wow nice sword, give me that

A degree of impact is determined with the following equation on the basis of: the number of words having been inputted, n; an order that the words have been inputted, i; and the number of words constituting a word group, m. That is, a mean value of i/n is defined as a degree of impact.

$$w = \sum_{j=1}^{m} \frac{i_j}{n} / m \qquad \text{Equation 1}$$

A degree of impact w for a word group is calculated for each of the word groups by use of the above Equation 1. FIG. 9 is a diagram showing a value of degree of impact corresponding to each of the word groups. Note that the condition for obtaining combinations of word groups and motion IDs from the statistical information table 112 has been set to seven combinations having the highest degree of usage. The above Equation 1 indicates that the more recent the words of a combination have been inputted, the larger the degree of impact the combination has on the conversation. Next, importance evaluation will be described by use of this example.

FIG. 10 shows the result obtained from a search in the statistical information table 112 in the above example. The result obtained from the search in the statistical information table 112 is temporarily stored in the client terminal as a list of motion candidates. Importance evaluation is carried out on the basis of importance which, in this example, is calculated by use of degree of usage and the weights shown in FIG. 9. Here, by expressing a word group as a search condition as key, and a degree of usage thereof for a motion ID P(key, id), an importance V(id) of the motion ID is obtained by the following equation by using a weight w(key) corresponding to the word group.

$$V(id) = \Sigma w(key) \times P(key, id)| \qquad \text{Equation 2}$$

The following shows equations obtained by substituting values of FIGS. 9 and 10 into the above Equation 2.

$V(id=200784)=0.41\times 3/12+0.8\times 5/12+0.1\times 6/12+0.12\times 9/12=0.58$ $V(id=005322)=0.25\times 3/12+0.65\times 5/12+0.72\times 6/12+0.08\times 9/12=0.78$ $V(id=110333)=0.11\times 3/12+0.31\times 10/12=0.29$ $V(id=663154)=0.25\times 5/12+0.005\times 6/12+0.43\times 9/12=0.45$ $V(id=982351)=0.22\times 9/12=0.17$ Referring back to FIG. 8, importance evaluation is carried out on the basis of the importance obtained in step S22 (step S24). Importance evaluation refers, for example, to assigning a priority level to each of the respective motion IDs according to the priority order thereof, and determining only motion IDs equal to or above a threshold as a motion candidate. In this example, after the motion candidates are assigned with a priority level according to their importance order, the motion candidates are presented to the user in the following order: ID "005322", ID "200784", ID "663154", ID "110333", and ID "982351". Hence, motion candidates matching the conversation can be selected from the words constituting the conversation, and presented to a user. In addition, priority levels can be presented together with the candidates. A method for presenting motion candidates will be explained in the examples described below.

Referring back to FIG. 7, after motion candidates are determined in step S15, the motion candidates are outputted on the client terminal (step S16). After the output of the motion candidates, it is determined whether the user has selected a motion from the motion candidates (step S17). In the cases where a motion has been selected, and where it is determined that the user has inputted a motion ID or the like in step S13, motion data is obtained from the motion DB 210 according to a search condition which is a motion data index corresponding to the motion designated by the user, and then an avatar moving in the designated manner is rendered. The rendered image is outputted through the output unit 206, such as a screen (step S18). After that, the statistical information table 112 and the counter table 113 are updated (step S19).

Figures 11, 12:
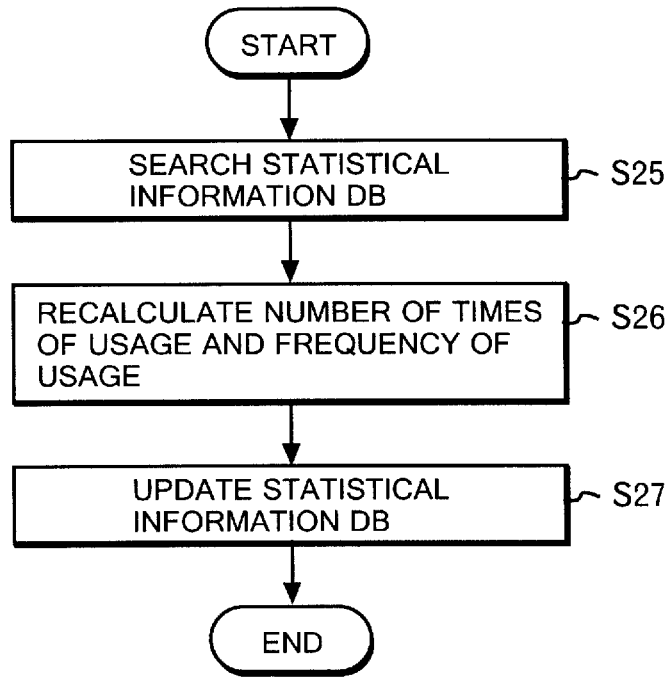
FIG. 11 is a diagram illustrating the flow of update processing.
FIG. 12 is a diagram showing a result obtained from a search made in the statistical information table.

FIG. 11 is a flowchart illustrating the update processing. The processing is initiated after the motion data index is transmitted to the client terminal. A search is made in the statistical information table 112 by using the word group generated in step S11 and the motion ID used in step S12 as a search condition. Likewise, a search is made in the counter table 113 by using the same word group used above as a search condition (step S25).

FIG. 12 shows a result of the search made in the statistical information table 112 in the case where a motion ID "005322" is used in the above-mentioned example. Regarding each of the combination of a word group and a motion ID which have been obtained in the search, the number of times the combination is used in the current operation is added to the number of times of usage N stored in the statistical information table 112, and to the number of times of usage M stored in the counter table 113 (step S26). If the added number of times is 1, the number represents the number of times of usage, and the degree of usage indicates the usage frequency. The added number may also be a value including the degree of impact used in weighting. The degree of usage is calculated as N/M. At this time, the following regions are updated for each of the combinations searched as described above: the degree of usage region, the usage counter region, and the last used date region in the statistical information table 112, and the usage counter region in the counter table 113 (step S27).

Combinations not retrieved in the search are newly registered in the statistical information table 112 and the counter table 113. Incidentally, instead of registering all of the combinations not retrieved, only those having a certain degree of impact may be registered, for example. Here, if the combination is registered only for its word group, the number of times of usage in the counter table 113 is updated.

Referring back to FIG. 7, it is determined whether a word is continuously inputted after the completion of the update processing in the step S19 (step S20). Every time a word is inputted, presentation and update processing of motion candidates are carried out incrementally. In this case, not only a newly inputted word but also the words inputted in the preceding conversational sentence are used to form a new word group. A search is made in the statistical information table 112 for the new word group. To be more specific, importance calculation and importance evaluation are carried out by using the motion candidates newly searched out together with the motion candidate list temporarily stored in the client terminal. Then, the newly obtained motion candidates thus obtained are presented to the user.

In the course of this process, in order to transmit a conversational sentence to the other user, the sentence is first transmitted to the server. As a way of transmitting a sentence to the server, the sentence may be transmitted in the case where a predetermined condition is satisfied. The cases where a predetermined condition is satisfied may include, for example, cases where a user sends a sentence by pressing a button or the like, and where a sentence is automatically sent when there is no input for a certain period of time. Since motion candidates are presented every time a word is inputted, a user is allowed to have decided an avatar motion upon transmitting the sentence. Note that the sentence does not need to be completed. In this way, the avatar can be caused to move concurrently with the transmission of the sentence. In addition, since the motion candidates which have already been retrieved can be used as they are, the number of searches can be reduced whereby the search can be accelerated. Note that avatar motion candidates can be presented to a user by using only a newly inputted sentence. This is made possible by starting a new line in the conversational sentences, or by a user deleting previously inputted dialogues from the chat window, for example.

Above, a description has been given of displaying motion candidates upon input of a chat text, in the case where the sentence analysis unit 202 is provided to the client terminal. In another case, the sentence analysis unit 202 may be provided in the server. In such a case, word groups are formed in the server, and thus an inputted sentence is forwarded to the server to form a word group.

Every time a motion is designated by a user, or a motion is used by a user, the statistical information table 112 and the counter table 113 in the statistical information DB 110 are updated. There are two updating patterns: one is modification of numeric data, such as the number of times of usage, and another is addition of information. The addition of information refers to addition of information to the statistical information table 112 and the counter table 113 in the statistical information DB 110 when a word group or a new combination of a word group and a motion is generated. If information is continuously added to the statistical information table 112 and the counter table 113 in this manner, an enormous number of word groups or combinations of a word group and a motion ID would be accumulated in the statistical information table 112 and the counter table 113. Meanwhile, some of the combinations of a word group and a motion ID are hardly ever used. Storage of these pieces of data in the statistical information table 112 and the counter table 113 leads to accumulation of unnecessary data, resulting in an increase in the data amount and thereby a longer time required for data retrieval. In order to solve this problem, it is configured that the tables are edited at predetermined time intervals.

The predetermined time interval can be set freely by an administrator, for example, who is in charge of the statistical information DB 110. For instance, the tables may be edited once a day, once a month, for example. The last used date, the usage counter and the degree of usage of the statistical information DB 110 are used for the edition. For example, the tables are edited by deleting combinations of word groups and motions having a usage frequency or degree of usage of a certain threshold or lower, which have not been used for a few days. In this way, the tables are maintained at an optimal state so that motion candidates matching a sentence can be appropriately presented to the user.

A description will be given of a procedure of presenting motion candidates to a user, in the case where the present invention is applied, by referring to examples.

Example 1

Figure 13:
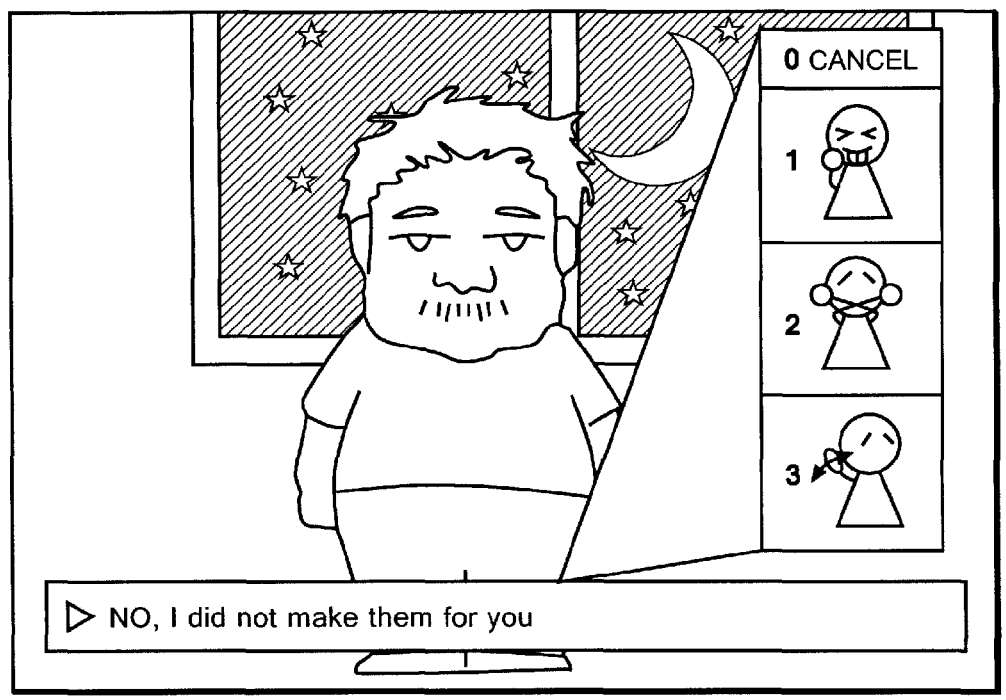
FIG. 13 is a view of a computer screen showing an input of a conversational sentence and presentation of motion candidates.

As a first example, a description will be given of a method for making a selection from motion candidates displayed in the form of a pop-up window. Suppose that avatars are chatting in English in a virtual world. Conversational sentences inputted by the users are displayed in a chat window on the screen. Upon detecting word input has been completed, the server transmits motion candidates matching the sentences having been inputted. FIG. 13 is a view of a computer screen showing chat input and motion candidates presented in the form of a pop-up window. As shown in the figure, the list of selected motion candidates is displayed in a pop-up window, and the window is shown such that the sentence which has been used to select the motion candidates can be identified. Here, motion candidates are simple illustrations of the motions so that a user can easily recognize the meanings by looking at them.

Figure 14:
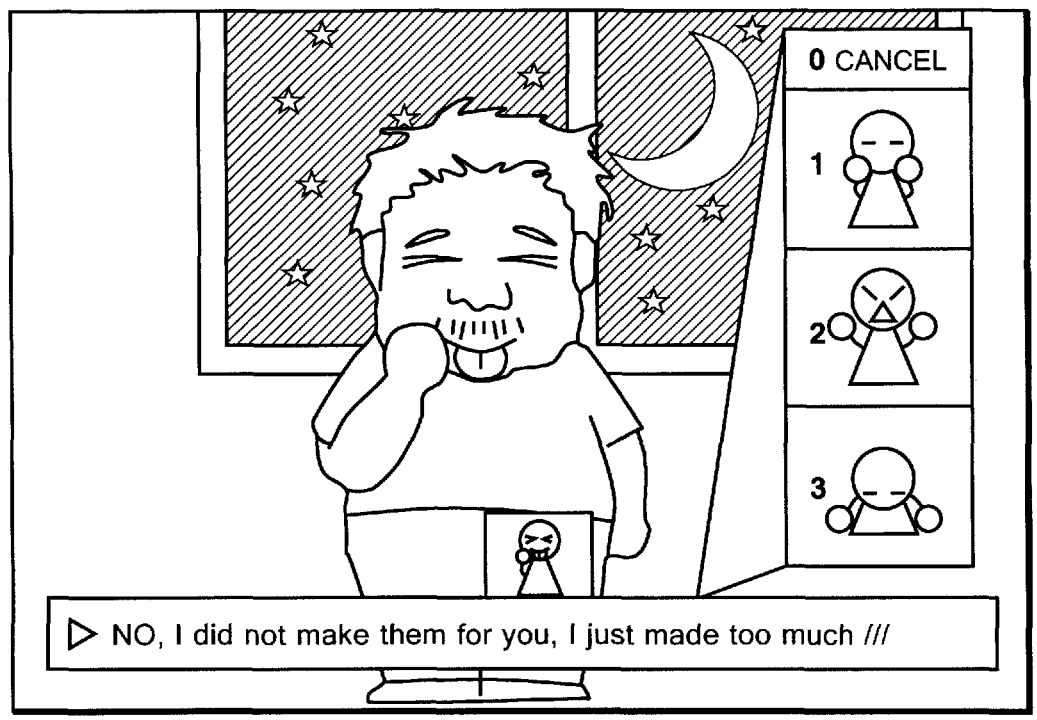
FIG. 14 is a view of the computer screen showing selection of a motion candidate by a user and presentation of motion candidates in the case where the user subsequently inputs words.

FIG. 14 is a view of the computer screen showing the selection of a motion candidate by a user and presentation of motion candidates in the case where the user subsequently inputs words. When a motion is selected from the motion candidates presented as in FIG. 13, a small figure of the selected motion is displayed above the chat window. At this time, the avatar moves in the selected manner. Words are subsequently inputted, and motion candidates are presented again upon the completion of the input. These motion candidates are selected to be presented on the basis not only of the newly inputted words but also of the previous sentence. In the present example, since both first and second motions selected are to be reflected to the avatar motion, the first motion is terminated once the second motion is selected. However, in the case where the first selection relates to an avatar motion and the second selection relates to a change in the facial expression of the avatar, that is, where the selections are of the combination of emotion and motion, the avatar can carry out both movements at the same time. In this configuration, a user can clearly recognize motions corresponding to a conversational sentence, and easily select one of the motions since they are expressed in the form of illustration. Moreover, since the motion selected for a previous sentence is displayed on the screen, the user is allowed to select for the following inputted sentence a motion in the combination with the previous selection.

Example 2

Figure 15:
FIGS. 15A to 15C are views showing a flow of presentation of motion candidates and selection of a motion in the kanji-conversion system.
Figure 15:
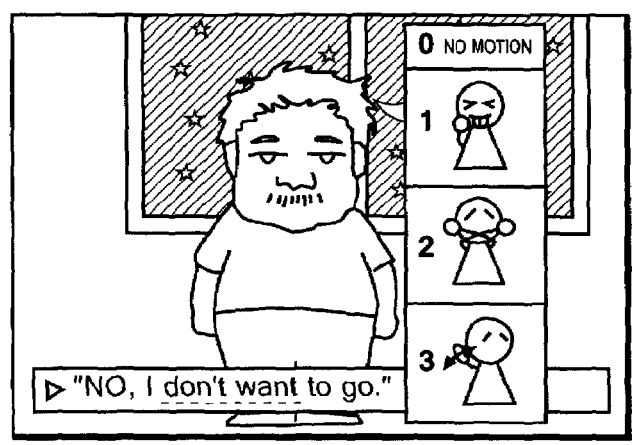
Figure 15:

As a second example, a description will be given of a method for making a selection from motion candidates displayed in the kanji-conversion system. Here, suppose that avatars are chatting in Japanese in a virtual world. FIGS. 15A to 15C are views showing a flow of presentation of motion candidates in the kanji-conversion system, and selection of a motion. FIG. 15A is a view of a computer screen when a sentence is inputted and then subjected to kanji-conversion. The English translation of phrases 1 through 7 of FIG. 15A are:

1. iyadayo (phonetic "Ee-yah-dah-yoh");
2. iy a-dayo ("No, I don't want to go");
3. iyada-Yo ("The answer is negative");
4. iyadAyo—("I hate it");
5. Iya-dayo ("That's 'Iya'" (family name/locale #1));
6. iYa-dayo ("That's 'iYa'" (family name/locale #2)); and
7. iyA-dayo ("That's "iyA"" (family name/locale #3)).

FIG. 15B is a view of the computer screen presenting motion candidates for the sentence having undergone the kanji-conversion in FIG. 15A. In the same manner as in kanji-conversion where a sentence portion to be converted is underlined, a sentence portion for which a motion should be selected is underlined. FIG. 15C illustrates that, after the kanji-conversion and determination of a motion for "Ivadavo (I hate it)," the subsequent sentence "Ikitakunai (I don't want to go)" is recognized as an object: which is to be subjected to kanji-conversion; and for which a motion should be selected. In this configuration, a motion can be selected through the same operation as that for kanji-conversion.

Example 3

Figure 16:
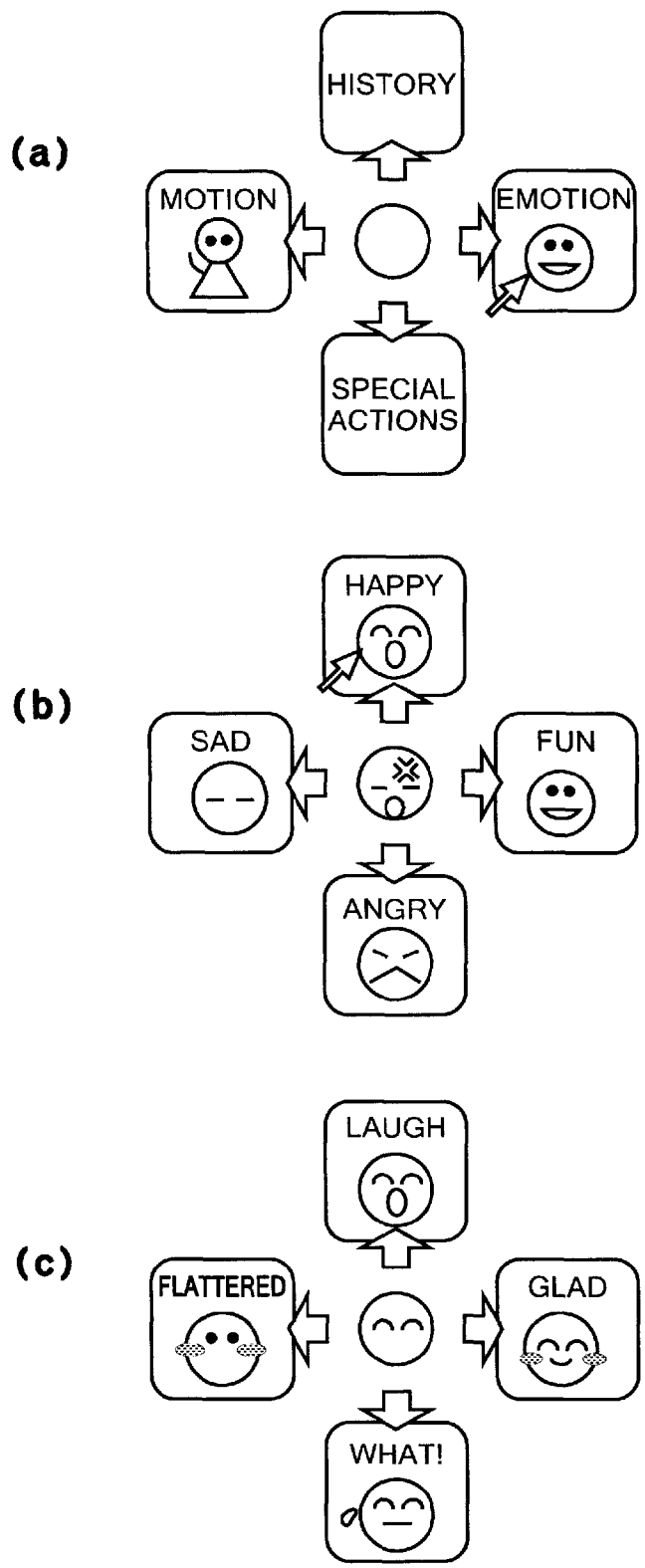
FIGS. 16A to 16C are diagrams illustrating motion candidates narrowed down based on categorization.

As a third example, a description will be given of a method for selecting motion candidates by narrowing them down according to their categories. FIG. 16 is a diagram illustrating the narrowing down of motion candidates according to their categories. As in FIG. 16A, motion candidates corresponding to an inputted sentence are categorized into history, action, emotion and the like, and the categories are displayed to be available for selection. In this case, not only categories into which the motion candidates are categorized but also unrelated categories, such as special actions made by the avatar in a conversation, can be displayed. When the "emotion" category is selected, the motion candidates are divided into more detailed categories as in FIG. 16B. When a "happy" category in the "emotion" category is further selected, motion candidates corresponding to "happy" are displayed as shown in FIG. 16C. Thus, instead of directly displaying motion candidates, the candidates are categorized, and therefor a user is allowed to narrow down the motion candidates within one of the categories. This configuration is effective in the case of presenting a large number of motion candidates to a user.
Representative Example for Hardware Configuration of Server and Client Terminal:

FIG. 17 is a diagram showing an information processor 400 as a representative example for a hardware configuration of the server and the client terminal which have been described with reference to FIGS. 1 and 2. Here, an example of a hardware configuration of the information processor 400 will be described. The information processor 400 includes a CPU (central processing unit) 1010, a bus line 1005, a communication interface 1040, a main memory 1050, a BIOS (basic input output system) 1060, a parallel port 1080, a USB port 1090, a graphic controller 1020, a VRAM 1024, an audio processor 1030, an input/output controller 1070, and input means 1100, such as a keyboard and a mouse. Storage means, such as a flexible disk (FD) drive 1072, a hard disk 1074, an optical disk drive 1076, and a semiconductor memory 1078, can be connected to the input/output controller 1070.

An amplifier circuit 1032, a speaker 1034 and a microphone 1035 are connected to the audio processor 1030. Meanwhile, a display 1022 is connected to the graphic controller 1020.

In the BIOS 1060, a boot program that the CPU 1010 executes at the time of startup of the information processor 400, programs depending on the hardware of the information processor 400, and the like are stored. The FD drive 1072 reads a program or data from a flexible disk 1071, and provides the program or data to the main memory 1050 or the hard disk 1074 via the input/output controller 1070.

In addition to the optical disk drive 1076, a DVD-ROM drive, a CD-ROM drive, a DVD-RAM drive, or a CD-RAM drive can be used, for example. In this configuration, an optical disk 1077 can be used. The optical disk drive 1076 is capable of reading a program or data from an optical disk 1077 and providing the program or data to the main memory 1050 or the hard disk 1074 via the input/output controller 1070.

A computer program stored in a recording medium, such as a flexible disk 1071, an optical disk 1077, and a memory card, is provided to the information processor 400 by a user. This computer program is read from a recording medium via an input/output controller 1070, or is downloaded via the communication interface 1040, to be installed and executed in the information processor 400. An operation that the computer program causes the information processor 400 to execute is as described above, and therefor explanation is omitted.

The computer program may otherwise be stored in an external storage medium. As the storage medium, a magneto-optical recording medium, such as a memory disc (MD), or a tape medium may be used in addition to the flexible disk 1071, the optical disk 1077 and a memory card. Otherwise, the computer program may be provided to the information processor 400 through a communication line by using a storage device, such as a hard disk, an optical disk library or the like which are provided in a server system connected to a dedicated communication line or the Internet, as the recording medium.

Although the description has been given mainly of the information processor 400 in the above example, functions similar to the information processor can be implemented by installing a program having the functions described for the information processor in the computer in order to cause the computer to operate as an information processor. Accordingly, the information processor described as an embodiment of the present invention can be implemented by a method or a computer program.

The apparatus of the present invention can be acquired as hardware, software, or a combination of hardware and software. In the case of implementing a combination of hardware and software, a typical example is a computer system including a predetermined program. In such a case, after the predetermined program is loaded and executed on the computer system, the computer system executes processing according to the present invention. The program is composed of a group of instructions which can be expressed in any language, code, or notation. Such a group of instructions allow the system to directly execute a specific function, or to execute the specific function after (1) the program is converted into another language, code or notation, and/or (2) the program is copied to another medium.

The present invention includes not only such a program itself, but also program products, such as a medium in which the program is recorded, in the scope of the invention. A program for executing the functions of the present invention can be stored in any computer readable medium, such as a flexible disk, a magneto-optical memory (MO), a CD-ROM, a DVD, a hard disk device, a ROM, an MRAM, and a RAM. The above-described program may be downloaded from another computer system connected by a communication line, or may be copied from a different medium so as to be stored in a computer readable medium. Moreover, the program may be compressed or be divided into multiple pieces to be stored in one or multiple recording media, respectively.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for supporting communication among avatars representing users in a virtual world shared by a plurality of users' client terminals and a server connected with each other through a network, the method comprising the steps of:
    accumulating statistical information, which includes (i) a plurality of combinations of word groups and avatar motions that have been used in association with the word groups in messages, the messages transmitted by one or more avatars, and the avatar motions being generated by commands distinct from the word groups the and (ii) a degree of usage of the combinations, corresponding to a frequency with which one or more different avatar motions have been used together with each word group;
    generating a keyword group from text content in a first message transmitted by the one or more avatars in response to the transmission of the first message;
    searching through the statistical information to compare the keyword group to the word groups to extract the avatar motions associated with the keyword group and the degrees of usage of the combinations of the respective avatar motions and the keyword group;
    obtaining one or more avatar motions as motion candidates for a motion that the avatar is to take for the first message transmitted thereby, wherein the one or more avatar motions have a degree of usage satisfying a predetermined condition; and
    presenting the avatar motion candidates to the user of the avatar.

2. The method according to claim 1, further comprising a step of: updating the statistical information according to each of the keywords in the keyword group and according to a motion of the avatar, to form a new word group or to update a degree of usage of the word group corresponding to the keyword group and an associated avatar motion.

3. The method according to claim 1, wherein the statistical information includes an update history which is a record of updating of the statistical information.

4. The method according to claim 3, further comprising a step of editing the statistical information according to the update history.

5. The method according to claim 1, wherein the degree of usage is calculated on the basis of: the number of times that the motion has been used and a degree of impact that the component makes on the motion,
    wherein the degree of impact is based on a number of words in the first message, an order of the words in the first message, and a number of words that comprise the keyword group.

6. The method according to claim 1, further comprising a step of: retrieving an avatar motion and the degree of usage from the statistical information by use of a new keyword group that includes an added word.

7. The method according to claim 6, wherein one of the users adds a word to the first message after the motion candidates for the avatar is presented.

8. The method according to claim 1, wherein the first message is a text sentence of a chat.

9. A system, including users' client computer terminals and at least one server computer, for supporting communication among avatars representing users in a virtual world shared by a plurality of the users' client computer terminals and the server computer which are connected with each other through a network, the system comprising:
    a statistical information storage unit, comprising a memory device, for storing combinations, each combination including a word group of a message transmitted by one or more avatars and an avatar motion used together with the word group, and a degree of usage of each of the combinations based on a frequency with which the word group has been used together with the avatar motion, wherein the avatar motion is generated by a command distinct from the word group;
    a keyword generation unit for generating a keyword group from text content of a first message transmitted by an avatar in response to the transmission of the first message;
    a motion extracting unit for searching through the statistical information by use of the keyword group to extract the avatar motions and the degrees of usage according to the keyword group;
    a motion candidate determination processing unit for obtaining the avatar motions each having a degree of usage that satisfies a predetermined condition, as motion candidates for a motion that the avatar is to take for the first message transmitted thereby; and
    a motion presentation unit for presenting one or more of the avatar motions obtained as the avatar motion candidates, to the user of the avatar.

10. The system according to claim 9, further comprising: a statistical information updating unit for updating the statistical information storage unit according to (i) each of the keywords in the keyword group and (ii) a motion of the avatar.

11. The system according to claim 9, wherein the statistical information storage unit includes an update history which is a record of updating of the statistical information storage unit.

12. The system according to claim 11, further comprising a statistical information editing unit for editing the statistical information storage unit according to the update history.

13. A communication support server device including one or more processors and memory for supporting a virtual world accessible by a plurality of users' client terminals through a network, the communication support server device comprising:
    a communication unit for receiving from a client terminal any one of a first message and a keyword group of the message in response to input of the first message from any one of the users to the client terminal; and
    a statistical information storage unit in the memory of the communication support server device for storing combinations, each combination including a word group of a message transmitted by one or more avatar users and an avatar motion used together with the word group,
    and a degree of usage of each of the combinations based on a frequency with which the avatar motion has been used together with the word group, wherein the avatar motion is generated by a command distinct from the component, the avatar motion generated together with the component;

wherein the communication unit is configured for transmitting, to the client terminal having transmitted the first message, the first message or the keyword group received, and avatar motion candidates having been recognized to match the message in the statistical information storage unit.

14. A non-transitory computer readable medium tangibly embodying computer readable instructions for executing a computer implemented method for supporting communication among avatars representing users in a virtual world shared by a plurality of users' client terminals and a server connected with each other through a network, the method comprising the steps of:

accumulating statistical information, which includes (i) combinations of word groups of messages transmitted by one or more avatars and avatar motions used together with the word groups, the avatar motions generated by a command distinct from the word groups, and (ii) a degree of usage of the combinations based on a frequency with which the avatar motions have been used with the word groups;

generating a keyword group from the components of a first message transmitted by the one or more avatars in response to the transmission of the first message;

searching through the statistical information by use of the keyword group to extract the avatar motions and the degrees of usage according to the keyword group;

obtaining one or more avatar motions as motion candidates for a motion that the avatar is to take for the message transmitted thereby, wherein the one or more avatar motions have a degree of usage satisfying a predetermined condition; and presenting the avatar motion candidates to the user of the avatar.

15. The method according to claim 5, wherein the degree of impact is calculated according to an equation:

$$w = \sum_{j=1}^{m} \frac{i_j}{n} / m$$

where w represents the degree of impact, n represents the number of words in the first message, i represents the order in which the words are input, and m represents the number of words constituting the keyword group.

* * * * *